United States Patent [19]

Gavin et al.

[11] 3,914,325

[45] Oct. 21, 1975

[54] METHOD FOR PREPARING PHENOL COMPOUNDS USING MIXED ACID SYSTEM

[75] Inventors: David F. Gavin, Cheshire; John H. Tobin, Hamden, both of Conn.

[73] Assignee: Olin Corporation, New Haven, Conn.

[22] Filed: June 21, 1973

[21] Appl. No.: 372,244

[52] U.S. Cl....... 260/623 R; 260/621 N; 260/622 R
[51] Int. Cl.² ........................................... C07C 39/24
[58] Field of Search ........... 260/624 R, 619, 621 M, 260/623 R, 621 N, 623 D, 622 R

[56] References Cited
UNITED STATES PATENTS

| | | | |
|---|---|---|---|
| 2,273,030 | 2/1942 | Fitzky et al. ......................... | 260/621 |
| 2,489,423 | 11/1949 | Lawson et al ....................... | 260/623 |
| 3,251,889 | 5/1966 | Kulka.................................. | 260/622 |

OTHER PUBLICATIONS

Finger et al., "Amer. Chem. Soc.," Vol. 81 (1959) pp. 94–101.

Schoutissen, "Amer. Chem. Soc.," Vol. 55 (1933) pp. 4531–4534.

Pettit et al., "Jour. Chem. Soc. London," (1954) pp. 3852–3854.

Kozlov et al., "Chem. Abs.," Vol. 71 (1969) p. 494 31w.

Primary Examiner—James O. Thomas, Jr.
Assistant Examiner—W. B. Lone
Attorney, Agent, or Firm—Kenneth P. Glynn; Eugene Zagarella, Jr.

[57] ABSTRACT

This invention relates to a novel integrated route to selected phenols by diazotization of selected aminobenzene compounds in a mixed phosphoric-sulfuric acid system and subsequent decomposition of the diazonium salt.

14 Claims, No Drawings

METHOD FOR PREPARING PHENOL COMPOUNDS USING MIXED ACID SYSTEM

This invention relates to an improved integrated method for the preparation of selected phenols and more particularly ortho-fluorophenol.

A previously well-known method for preparing various phenol compounds has involved the diazotization of a selected aminobenzene compound in sulfuric acid followed by decomposition to obtain the desired phenol compound as disclosed in G. C. Finger et al., "Aromatic Fluorine Compounds. VIII. Plant Growth Regulators and Intermediates", Jour. Amer. Chem. Soc., Vol. 81, 1959, pp. 94–101. Another technique involving diazotization of amino compounds and the preparation of phenols is disclosed in the above-noted Finger et al. article (see also G. C. Finger et al., "Aromatic Fluorine Compounds. IV. 1,2,3,5-Tetrafluorobenzene", Jour. Amer. Chem. Soc., Vol. 73, 1951, pp. 152–153 and H. A. J. Schoutessen, "The Diazotization of Very Weakly Basic Amines", Jour. Amer. Chem. Soc., Vol. 55, 1933, pp. 4531–4533). This technique involves a two-step procedure wherein the amine is first diazotized in sulfuric acid and then the reaction is driven to completion by the addition of phosphoric acid. This method has the disadvantage of using a more involved two-step diazotization procedure and more significantly results in low yields when compared to the method of this invention.

Now it has been found that selected phenol compounds can be conveniently and economically provided in an integrated method from selected aminobenzenes by first diazotizing said aminobenzene in one step with an appropriate nitrosating agent such as sodium nitrite in a mixed phosphoric and sulfuric acid system and then decomposing the resulting diazonium salt with heat to form the respective phenol compound. The selected phenol compounds which may be prepared by the method of this invention have the following general formula:

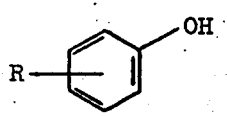

wherein R is selected from the group consisting of halogen, and more particularly, fluorine, chlorine, bromine and iodine; trifluoromethyl; nitro; and alkyl and more particularly lower alkyl of 1 to 4 carbon atoms. The more particularly preferred R groups are fluorine and trifluoromethyl. It is further noted that phenol compounds containing other substituents which are innocuous to the reaction being carried out may be prepared by the method of this invention including for example, cyano, alkoxy, and carboxylic acid groups. Additionally the prepared compounds may contain more than one of such noted substituents.

The method of this invention resulted in surprising and unexpected high yields particularly when compared with the results of the two-step Finger et al. procedure previously described. As noted in Examples V and VI, o-fluorophenol was prepared in yields of about 41 to 51% when using the Finger et al procedure as compared to the significantly higher yields when using the method of this invention as shown in the other Examples.

The starting materials for this invention are the aminobenzenes of the following formula:

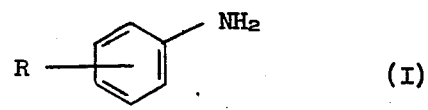

wherein R is selected from the following groups: halogens such as fluorine, chlorine, bromine and iodine; trifluoromethyl; nitro and alkyl and more particularly lower alkyl of 1 to 4 carbon atoms, e.g. methyl, propyl and butyl. The particularly preferred R groups are fluorine and trifluoromethyl. It is further noted that one or more of such substituents may be used as well as other substituents which are innocuous to the reaction such as cyano, alkoxy and carboxylic acid.

Illustrative of such starting materials are the following: o-fluoroaminobenzene, m-fluoroaminobenzene, p-fluoroaminobenzene, o-chloroaminobenzene, m-bromoaminobenzene, p-iodoaminobenzene, o-, m- and p-trifluoromethyl aminobenzene, o-, m-, and p-nitroaminobenzene, o-methylaminobenzene, m-ethylaminobenzene and p-butylaminobenzene.

A wide variety of nitrosating agents may be employed in carrying out the method of this invention including the following: alkali metal nitrites such as sodium and potassium nitrite, dinitrogen trioxide, nitrous acid, nitrosyl halides such as nitrosyl chloride and nitrosyl bromide and nitrosyl salts such as nitrosyl perchlorate, nitrosyl tetrafluoroborate and nitrosyl sulfate. Other useful nitrosating agents are disclosed in "Azo and Diazo Chemistry-Aliphatic and Aromatic Compounds" by H. Zollinger, 1961, pp. 27–32. Of these compounds, sodium nitrite is the preferred nitrosating agent.

In carrying out the method of this invention, the total amount of acid in the mixed acid system will generally vary from about 2:1 to about 10:1 and preferably from about 3:1 to about 6:1 moles of acid per mole of selected aminobenzene compound (I). It is noted that the upper limit of total acid used is not particularly critical except as an economic and practical consideration. The proportion of the respective acids will generally vary from about 1:25 to about 10:1 and preferably from about 1:9 to about 9:1 moles of phosphoric acid per mole of sulfuric acid. A more preferred range is from about 1:1 to about 6:1 moles of phosphoric acid per mole of sulfuric acid.

The amount of nitrosating agent utilized in the method of this invention will generally be a stoichiometric amount or slight excess thereof. More particularly the molar ratio of nitrosating agent to selected aminobenzene compound will be from about 1:1 to about 1.5:1, preferably from about 1:1 to about 1.1:1 and more preferably about 1:1.

The mixed phosphoric-sulfuric acid system which is used in the diazotization of the aminobenzene compound (I) will generally have an overall concentration of from about 30 to about 98% in aqueous media and preferably from about 60 to about 96%.

The diazotization temperature employed may vary from about −5° to about 50°C. and preferably from about 0° to about 20°C. and the reaction may generally be carried out under varying pressure conditions. More particularly the pressure of the reaction may be from about 0.5 to about 50 atmospheres with the preferred pressure being from about 0.8 to about 1.5 atmospheres and more preferably atmospheric pressure. The decomposition temperature will generally vary from about 100 to about 160°C. and preferably from about 110° to about 130°C.

It is noted that while decomposition may be carried out at the above-indicated temperatures, it is desirable and preferable to bring the diazonium salt to such temperature by slowly adding the reaction mixture containing said salt at or near its temperature of formation to a heated solution of water or an aqueous mineral acid solution, preferably phosphoric or sulfuric acid. This will avoid excessive and uncontrollable gas formation and also will significantly reduce by-product coupling reactions. There is no particular criticality to the time period over which such addition can take place and generally 2 to 15 hours will be used, however, more or less time may be used if desired.

While the decomposition may be carried out in the absence of a catalyst, it is generally preferred to employ a copper catalyst. Useful catalysts include elemental copper and salts containing the cuprous and cupric ions such as copper sulfate, copper phosphate, the copper halides and copper oxide with copper sulfate and copper oxide being preferred. The amount of copper catalyst employed may vary widely and generally such catalyst will contain from about 0.01 g. atoms of copper up to a stoichiometric amount of copper per mole of prepared diazonium compound. Preferably the amount of copper catalyst employed will contain from about 0.5 to about 0.8 g. atoms of copper per mole of diazonium compound.

The following examples are further illustrative of the method of this invention.

EXAMPLE I

A three neck, one liter flask fitted with blade stirrer and thermometer was charged with 100 g. (1.0 mole) of 98% $H_2SO_4$, 400 g. (equivalent to 3.47 moles) of 85% $H_3PO_4$ and 100 ml. of water. The mixed acids were heated to 60°C. and 111 g. (1.0 mole) of o-fluoroaniline added to this mixture over a 20 -minute period. The mixture was allowed to cool to room temperature and the resulting salt slurry was further cooled with a sodium chloride-ice bath to 0°C. following which a solution of 77 g. (1.1 moles) of sodium nitrite in 100 ml. of water was added over a two hour period with the temperature remaining at about 0°C.

A three neck, 1 liter flask fitted with blade stirrer, thermometer, Dean-Stark trap and addition funnel was charged with 236 g (2.04 moles) 85% $H_3PO_4$ and 175 g (1.43 moles) $CuSO_4.5H_2O$. This mixture was heated to about 145°C. and the cold diazonium salt solution, prepared as noted above, was then added dropwise over a 4 to 5 hour period. The steam distilled o-fluorophenol was continuously collected in the Dean Stark trap.

The weight of the resulting organic layer was 130.0 g. and assayed as 74.9% o-fluorophenol by vapor phase chromatography (VPC). This corresponds to 97.4 g. of o-fluorophenol which represents a 87.7% yield based on charged o-fluoroaniline.

EXAMPLE II

A three neck, one liter flask fitted with blade stirrer and thermometer was charged with 200 g. (equivalent to 1.73 moles) of 85% $H_3PO_4$, 49 g. (0.5 mole) of 98% $H_2SO_4$ and 150 ml. of water. The mixed acids were heated to 80°C. and 81.0 g. (0.5 mole) of m-aminobenzotrifluoride (99%) added to this mixture dropwise over a one-half hour period. The solution was allowed to cool slowly to room temperature and the resulting salt slurry was further cooled to 15°C. with a cold water bath and then a solution of 38.5 g. (0.56 mole) of sodium nitrite in 55 ml. of water was added over a period of 2 hours to the slowly stirred slurry.

A three neck, one liter flask equipped with blade stirrer, thermometer and Dean Stark trap was charged with 100 g. of 98% $H_2SO_4$, 136 ml. of water and 87.5 g. of $CuSO_4.5H_2O$. This mixture was heated to reflux (110°–114°C.) and the clear diazonium salt solution, prepared as noted above, was added via a peristalic type pump over a period of 7.0 hours, the organic distillate being drawn off through the course of addition. The system was allowed to reflux overnight to collect an additional small amount of organic distillate.

The weight of the resulting organic layer was 90.0 g. and assayed as 82% m-hydroxybenzotrifluoride by VPC. This corresponds to a 91.1% yield based on charged m-aminobenzotrifluoride.

EXAMPLE III

A three neck, one liter flask fitted with blade stirrer and thermometer was charged with 43.8 g. (0.447 mole) of 98% $H_2SO_4$, 463.8 g. (4.02 moles) of 85% $H_3PO_4$ and 100 ml. of water. One hundred eleven g. (1.0 mole) of o-fluoroaniline was added slowly to the mixture with the temperature increasing from about 25°C. to about 80°C. The flask contents were allowed to cool slowly to room temperature and the resulting solution was chilled to 0°–5°C. using a salt-ice bath. Following this, 77 g. (1.1 moles) of sodium nitrite in 100 ml. of water was added over a 2 hour period.

The diazonium salt solution was decomposed and phased as in Example I yielding an organic layer of 120.3 g. which assayed as 74.4% o-fluorophenol by VPC. This corresponds to 89.5 g. of o-fluorophenol which represents a yield of 80.6% based on charged o-fluoroaniline.

EXAMPLE IV

A three neck, one liter flask fitted with blade stirrer and thermometer was charged with 361.3 g. (3.61 moles) of 98% $H_2SO_4$, 103 g. (0.89 mole) of 85% $H_3PO_4$ and 136 ml. of water. One hundred eleven g. (1.0 mole) of o-fluoroaniline was added slowly to the mixture with the temperature increasing from about 25°c. to about 80°C. The flask contents were allowed to cool slowly to about 25°C. and the resulting slurry was chilled to 0–5°C. using a salt-ice bath. Another 100 ml. of water was added to make the solution workable and then 77 g. (1.1 moles) of sodium nitrite in 100 ml. of water was added over a two hour period.

The diazonium salt solution was decomposed and phased as in Example I yielding an organic layer of 118.2 g. which assayed as 69.4 % o-fluorophenol by VPC. This corresponds to 82.0 g. of o-fluorophenol which represents a yield of 73.8% based on charged o-fluoroaniline.

EXAMPLE V

The procedure as described by Finger et al., noted above was carried out as follows.

To a three neck, one liter flask fitted with blade stirrer and thermometer containing 294 g. (3.0 moles)

concentrated H$_2$SO$_4$, 55.0 g. (0.5 mole) of o-fluoroaniline was added dropwise with the temperature allowed to increase to 60°C. The resulting solution of the aniline hydrosulfate salt was then allowed to cool slowly.

A nitrosylsulfuric acid solution was prepared by slowly adding 35 g. of sodium nitrite to 318 g. of concentrated H$_2$SO$_4$ (cooled to about 0°.). This solution was added to the above prepared amine salt solution at about 2° to 5°C. over a 50 minute period. This was followed by the dropwise addition of 175 ml. of phosphoric acid over a 50 minute period at a temperature of about 7° to 10°C. and stirring continued for another 40 minutes.

The diazonium solution was added to a solution of 87.8 g. CuSO$_4$.5H$_2$O, 228 ml. of water and 118 g. of concentrated H$_2$SO$_4$ over a three hour period at a temperature of from 120° to 158°C.

The weight of the resulting product was 29.0 g. and assayed as 80.1% o-fluorophenol by VPC. This corresponds to 23.3 g. of o-fluorophenol which represents a yield of 41.4% based on charged o-fluoroaniline.

EXAMPLE VI

The same procedure as in Example V was followed except the phosphoric acid was added at a temperature of from 30° to 35°C. over a period of 2.5 hours.

The resulting product had a weight of 36.8 g. and assayed as 78.2% o-fluorophenol by VPC. This corresponds to 28.8 g. of o-fluorophenol representing a yield of 51.4% based on charged o-fluoroaniline.

What is claimed is:

1. A method for preparing phenol compounds which comprises:

a. diazotizing an aminobenzene compound of the formula:

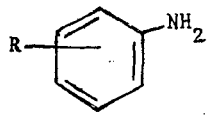

where R is selected from the group consisting of halogen, trifluoromethyl and alkyl of 1 to 4 carbon atoms in an aqueous medium in the presence of a nitrosating agent and a mixed phosphoric and sulfuric acid system at a temperature of from about −5° to about 50°C. to form a reaction mixture containing the diazonium salt of the aminobenzene compound, and b. heating said reaction mixture at a temperature of from about 100° to about 160°C. to decompose said diazonium salt to the corresponding phenol compound.

2. The method of claim 1 wherein said nitrosating agent is sodium nitrite.

3. The method of claim 2 wherein said acid system comprises from about 1:25 to about 10:1 moles of phosphoric acid per mole of sulfuric acid.

4. The method of claim 3 wherein R is selected from the group consisting of fluorine and trifluoromethyl.

5. The method of claim 3 wherein following diazotization, said reaction mixture containing said diazonium salt is slowly added to a heated solution selected from the group consisting of water, phosphoric acid and sulfuric acid to decompose said diazonium salt to the corresponding phenol compound.

6. The method of claim 5 wherein a molar ratio of from about 1:1 to about 1.5:1 of said sodium nitrite to said aminobenzene compound is used.

7. The method of claim 6 wherein said diazotization is carried out at a temperature of from about 0° to about 20°C. and said decomposition is carried out at a temperature of from about 110° to about 130°C.

8. The method of claim 7 wherein said acid system in the diazotization step is employed at a concentration of from about 30 to about 98% in aqueous media.

9. The method of claim 8 wherein R is selected from the group consisting of fluorine and trifluoromethyl.

10. The method of claim 9 wherein said acid system comprises from about 1:9 to about 9:1 moles of phosphoric acid per mole of sulfuric acid.

11. The method of claim 10 wherein the total amount of acid in the mixed acid system is from about 2 to about 10 moles of acid per mole of said aminobenzene compound.

12. The method of claim 11 wherein a copper catalyst selected from the group consisting of elemental copper, copper sulfate, copper oxide and copper halides is employed during said decomposition.

13. The method of claim 12 wherein said aminobenzene compound is o-fluoroaniline.

14. The method of claim 12 wherein said aminobenzene compound is m-aminobenzotrifluoride.

* * * * *